United States Patent [19]

Ganzer et al.

[11] Patent Number: 5,121,430
[45] Date of Patent: Jun. 9, 1992

[54] STORM ALERT FOR EMERGENCIES

[76] Inventors: Larry R. Ganzer, 5912 W. 95th St., Overland Park, Kans. 66207; Michael A. Fessler, 7105 E. 132nd St., Grandview, Mo. 64030; Daric G. Laughlin, 14818 Goodman, Overland Park, Kans. 66223

[21] Appl. No.: 657,502
[22] Filed: Feb. 19, 1991
[51] Int. Cl.⁵ .............................. H04L 9/00
[52] U.S. Cl. ...................... 380/48; 455/33.1
[58] Field of Search ........... 380/48, 50; 455/33, 455/58

[56] References Cited

U.S. PATENT DOCUMENTS

| | | |
|---|---|---|
| 3,891,792 | 6/1975 | Kimura . |
| 4,131,881 | 12/1978 | Robinson . |
| 4,161,728 | 7/1979 | Insam . |
| 4,205,343 | 5/1980 | Barrett . |
| 4,383,257 | 5/1983 | Giallanza et al. . |
| 4,394,687 | 7/1983 | Hutt et al. . |
| 4,429,385 | 1/1984 | Cichelli et al. . |
| 4,476,488 | 10/1984 | Merrell . |
| 4,575,750 | 3/1986 | Callahan . |
| 4,725,886 | 2/1988 | Galumbeck et al. . |
| 4,783,799 | 11/1988 | Maass ........... 380/43 |
| 4,788,543 | 11/1988 | Rubin ........... 380/50 |
| 4,916,539 | 4/1990 | Galumbeck . |
| 5,014,314 | 5/1991 | Mulford et al. ........... 380/43 |

OTHER PUBLICATIONS

DCR-400 Brochure; Nemar, Inc.; 4220 Proton Road Dallas, TX 75244; (214)233-7859; date unknown.

Primary Examiner—Thomas H. Tarcza
Assistant Examiner—David Cain
Attorney, Agent, or Firm—Litman, McMahon & Brown

[57] ABSTRACT

A geographically specific emergency alert system includes a code generator unit in which geographic areas to be alerted and types of severity of alerts are selected and code strings generated to represent the affected areas and alert types selected. The code strings are broadcast by modulating the audio carrier of a television signal and received on receiver units positioned in areas within the broadcast market of a television station providing the alerting service. Location codes or entered into the receiver units by the users according to the areas in which the receiver units are used. When an alert is broadcast, each receiver unit decodes a location code string in the signal. If it matches that set on the receiver, an alert code string is decoded to activate a alarm devices connected to the receiver, such as an audible alarm generator, LED, etc., in accordance with the type or severity of alert that was broadcast.

23 Claims, 3 Drawing Sheets

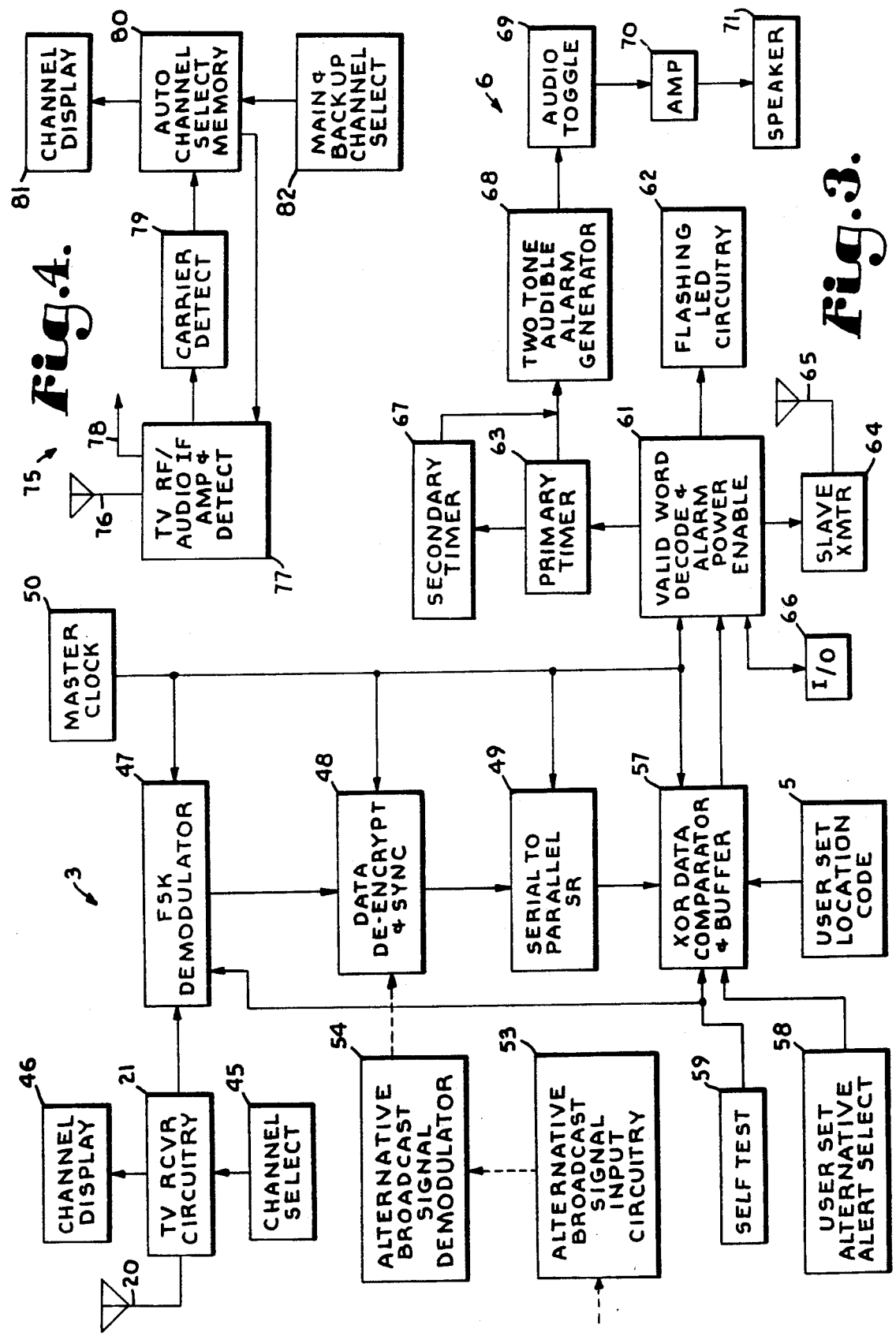

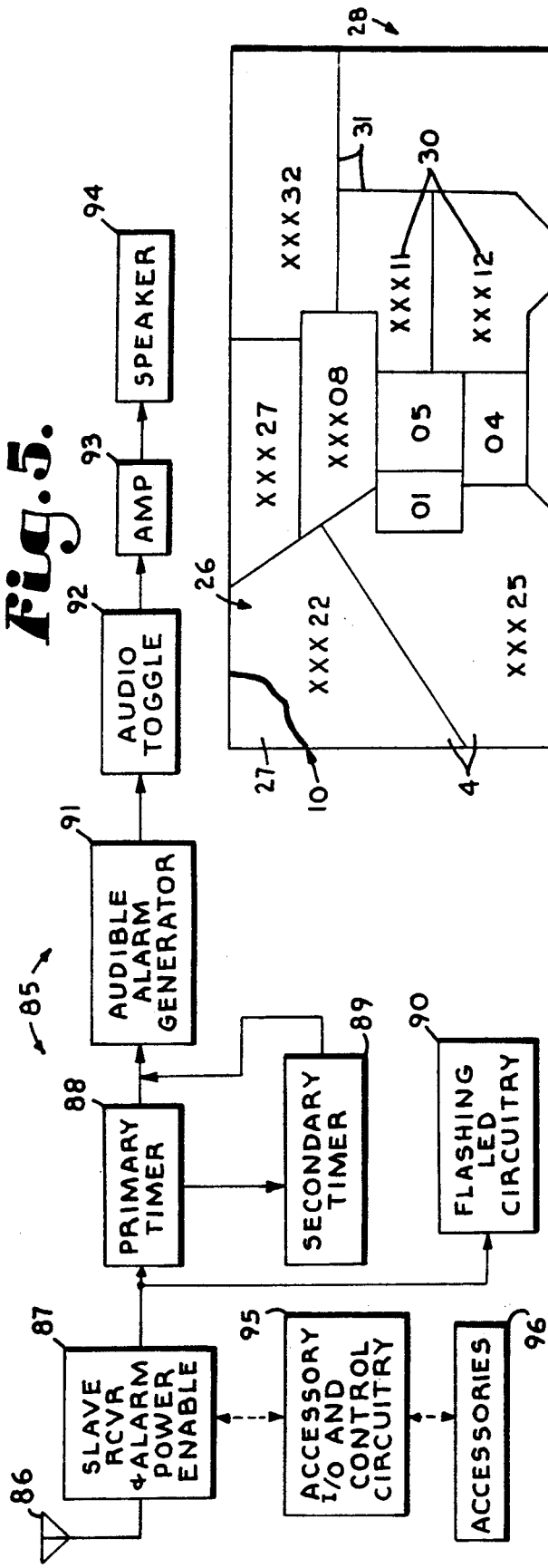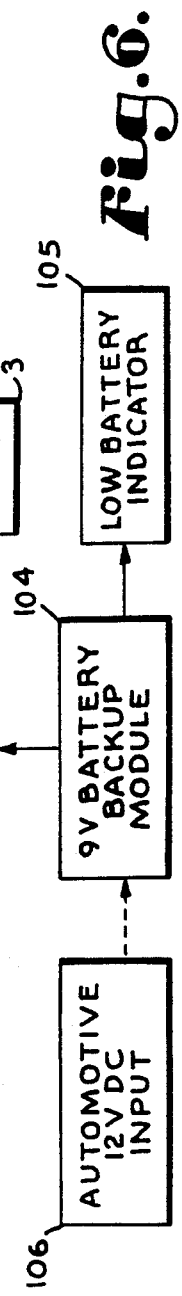
Fig. 5.
Fig. 7.
Fig. 6.

STORM ALERT FOR EMERGENCIES

FIELD OF THE INVENTION

The present invention relates to warning systems and, more particularly, to a system for broadcasting geographically specific warnings to receivers which are set by users, according to the geographic area in which the receiver is located, to receive warnings which are locally pertinent.

BACKGROUND OF THE INVENTION

A fact of life is that severe weather and civil disasters occur. While precautions are taken to avoid disasters, combinations of circumstances sometimes overcome such precautions We are yet virtually powerless to control the weather. Because we are often incapable of preventing disasters and have no means for nullifying or moving weather disturbances, our survival instincts lead us to devise methods for minimizing the toll of human lives and injuries that can result from severe weather and disasters. Thus, the weather is carefully monitored and forecast and warnings are issued when threatening weather patterns occur to allow persons in affected areas to take precautions. Similarly, fire and police departments and the military services are charged with the responsibilities, often overlapping, of dealing with and minimizing the loss of life and injuries resulting from fires, explosions, chemical leaks and spills, civil disturbances, air raids, and the like.

Several warning methods currently exist for alerting populations to tornadoes and other severe weather and emergencies. Television stations often superimpose an indicia indicating a thunderstorm watch and, if very severe weather is impending, interrupt normal programming to notify viewers of a tornado or severe storm warning. Deficiencies of this warning method are that a television set must be turned on, actively watched, and tuned to a local station to receive the warning. Many communities have a system of remotely controlled, diesel powered sirens, commonly referred to as civil defense or air raid sirens, to warn residents of emergencies. Such sirens are susceptible to mechanical breakdowns and must be taken out of service periodically for maintenance. At times local police and fire departments patrol the streets of neighborhoods with their sirens activated and periodically announcing emergencies over loudspeakers. This warning method may be ineffective because of inability to hear the sirens or announcements because of storm noise, distance from the siren, interfering noise levels within a residence, location of persons within a residence, or persons asleep in a residence. Siren type warning systems do not indicate the specific location of the impending emergency and often do not provide an "all clear". Because response to emergencies is usually disruptive of normal activities, false warnings or warnings which do not apply to particular individuals cause such persons to tend to ignore sirens and other relatively general types of warnings.

In a warning system currently in use by the National Weather Service, continuing weather bulletins are broadcast on a VHF frequency. Whenever severe weather threatens, an alert is broadcast which triggers an audible alarm in special receivers, such as the Weatheradio units available from Tandy Corporation. However, since the coverage areas of the broadcast stations usually encompass a number of county sized areas, it is possible to receive an alert on a receiver in an area to which the alert has no actual significance. At best, this amounts to a nuisance. Additionally, when an alert is triggered in such a receiver, it must be muted manually by the user since the system does not incorporate a broadcast "all clear" signal.

What is needed is a system of alerting populations to emergency conditions which is geographically specific, which is also specific as to the type of emergency condition, and which cannot be easily ignored or defeated by the persons for whom the warning is directed.

SUMMARY OF THE INVENTION

The present invention provides an alert system which issues geographically specific alerts which are received by receiver units within the intended alert area. In general, the system makes use of commonly known and geographically specific location codes such as ZIP codes or the like. The system includes a code generator unit which is located at a broadcast facility, preferably a television station, and includes a graphic location and type of alert selection device, such as a digitizer pad overlaid with a map of the geographic areas to be covered. Selection of areas on the digitizer pad and types of alerts causes digital codes to be generated which correspond to the selected areas and alert types. A composite code string including a location code string component and an alert code string component is encrypted and used to modulate the audio carrier of a television broadcast signal. The use of television frequencies economizes the system by employing existing equipment, communication channels, and circuitry which has been developed to a high state of reliability.

Receiver units for use in the system include television tuner circuitry tuned to the channel number of the station providing the service and demodulates the received signal to recover the encrypted composite code string. The encrypted signal is de-encrypted to recover the original location and alert code strings. Encryption of the signal reduces the possibility of false alerts. Each receiver unit is provided with location code switches which can be set by the user according to the current location of use of the receiver unit. The use of ZIP codes is preferred in the system since they are already assigned and widely known or easily determined. A data comparator within the receiver unit compares the user set location code with the broadcast location code string and, if a match is detected, activates and indicator LED's according to the content of the alert code string. In order to further reduce the occurrence of false alarms, the circuitry of the receiver unit requires that the matching location code be received a selected number of times before an alarm is sounded.

The receiver unit includes a primary timer which causes the alarm to be sounded for a selected period of time, after which a secondary timer takes over and periodically sounds a short warning until an "all clear" is broadcast from the broadcasting station. "All clear" signals are location specific and are issued in the same manner as alerts. The primary timer can be manually switched to the secondary timer by the user; however, an LED continues to be illuminated to indicate the continued existence of an alert condition. The audible and visual alarm indications are reset upon receipt of an "all clear" signal. The secondary timer is not interruptible by the user. In either timer mode, the user may also turn the audible alarm on or off at any time an alert condition exists.

The receiver unit may include a low power slave transmitter for activating slave alert receiver units within a user's residence. The slave receiver unit includes radio frequency receiver circuitry which receives an activation signal from the main receiver and includes a primary timer, secondary timer, and audible warning sounder, all similar to those in the main receiver unit. The slave unit is activated by a coded signal from the main unit and allows a user to extend the warning capability of the system to remote areas of a household, plant, farm, school, hospital, or the like. The main receiver unit or slave receiver unit may be provided with interfacing circuitry for operating peripheral equipment in response to a broadcast alert signal.

While the alert system of the present invention is preferably practiced using television signals broadcast over the air, the system can be modified to use other broadcast media such as cable television, FM radio, telephone systems, and the like. Additionally, while the system is described primarily in terms of local communities, the system may also be set up on a regional or national basis with the issuance of certain types of alerts from a national center.

OBJECTS AND ADVANTAGES OF THE INVENTION

The principal objects of the present invention are: to provide an improved alert system; to provide, particularly, an alert system for directing alert signals to specific geographic areas; to provide such a system for issuing watches and warnings related to tornadoes, thunderstorms, hurricanes, heavy snow, ice storms, flash floods, and other types of severe weather; to provide such a system which is also capable of issuing alerts related to other types of disasters such as chemical spills, forest fires, air raids, terrorist attacks, bomb threats, and the like; to provide such a system including receivers which are user settable to receive alert signals directed to a specific geographic area; to provide such a system which directs alerts to specific areas using commonly known and geographically based codes such as ZIP codes, telephone area codes and telephone number prefixes, and the like; to provide such a system which is broadcast over the air on existing broadcast radio frequencies and, preferably, on the audio portion of a television channel on which a local television channel operates; to provide such a system which is capable of issuing alerts on alternative media such as cable television channels, FM broadcast radio, a telephone system, or the like; to provide such a system in which the code strings within the broadcast signal are encrypted to avoid false alerts; to provide such a system in which locations for storm alerts are selected by superimposing a geographic area map onto a weather radar display to track the movement and severity of storms through the geographic area; to provide such a system which allows "all clear" signals to be broadcast to areas when the alerted threat has passed from such areas; to provide such a system in which the receivers are provided with the capability of users silencing a primary alarm but which continue to provide periodic user uninterruptible alarms until an "all clear" is issued; to provide such a system in which the receivers are normally powered by AC but which include battery backup; to provide such a system in which the receivers may include slave alarm units controlled thereby; to provide such a system which does not require users to subscribe to a service but merely purchase a receiver unit and tune it to a local television station providing the service; and to provide such a storm alert system which is economical to manufacture, precise and convenient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a block diagram of a main receiver unit of the system.

FIG. 4 is a block diagram of alternative receiver circuitry for the system which has the capability of automatically switching to a secondary alert broadcaster if signal is lost from a primary broadcaster.

FIG. 5 is a block diagram of a slave receiver unit of the system.

FIG. 6 is a block diagram of a battery backed power supply for the main receiver unit or a slave receiver unit of the system.

FIG. 7 is a diagrammatic top plan view of a geographic area map overlaid on a digitizer pad for selecting alert locations in the emergency alert system of the present invention.

DETAILED DESCRIPTION OF THE INVENTION

Figure 1:
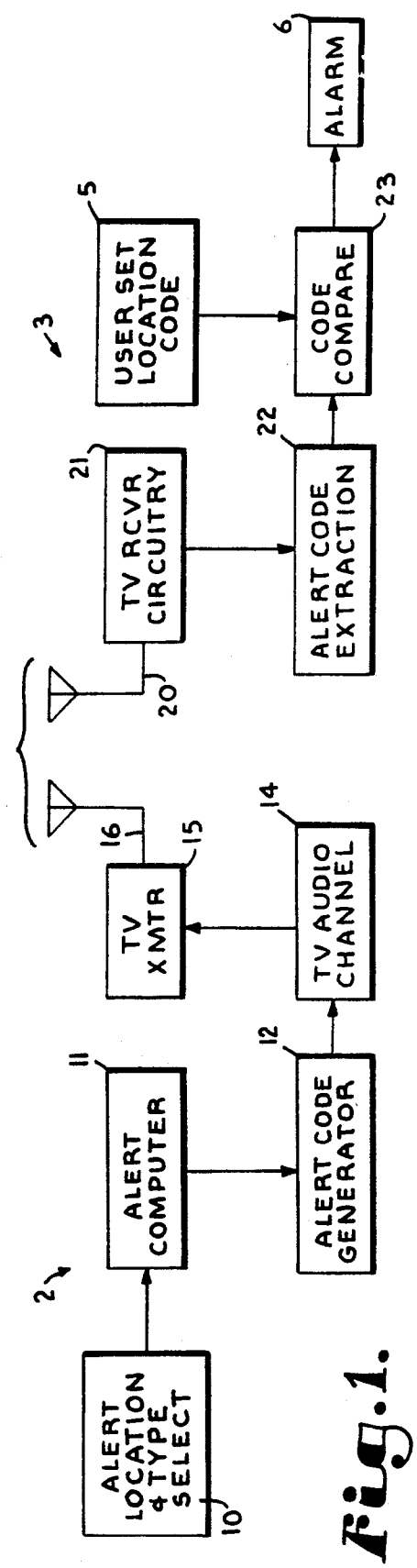
FIG. 1 is a simplified block diagram of an emergency alert system embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a storm alert system which embodies the present invention. The system 1 generally includes a code generator unit 2 and a plurality of receiver units 3 distributed throughout a plurality of geographic areas as represented by map areas 4 (FIG. 7). The code generator unit 2 allows the selection of a geographic area 4 and a type of alarm condition and generates a location code string and an alert code string which are used to modulate a broadcast signal of a broadcast medium. The receiver unit 3 includes code set circuitry 5 which allow the user to set a location code for the receiver, which usually corresponds to the geographic area 4 in which the receiver unit 3 is located. The receiver unit 3 receives the broadcast signal and demodulates same to recover the location code string and the alert code string. The location code string is compared with the user set location code and, if a match is detected, activates an alarm device 6.

Referring to FIG. 1, the code generator unit 2 includes a selection device or devices 10 for selection of the geographic area 4 and the type or severity of alert to be issued. Operation of the selection device 10 is interpreted by an alert computer 11. The alert computer 11 may be a generic type of personal computer or a specially dedicated type of computer or other control device, and the selection device 10 may be a keyboard or keypad or other input device of the alert computer 11. The alert computer 11 is interfaced to actual code generator circuitry 12 to cause the generation of digital code strings representing the selected area 4 and alert type and/or severity. The code generator circuitry 12 is interfaced to the broadcast medium circuitry, which is illustrated in FIG. 1 as the audio channel circuitry 14 of a television station whereby the audio carrier is modulated by the location and alert code strings. The audio channel circuitry 14 is connected to the television transmitter 15 which broadcasts the alert encoded signal over a television station antenna 16.

The receiver unit 3 receives the alert encoded broadcast signal on a receiver antenna 20 which is connected to television receiver circuitry 21. The receiver circuitry 21 is tuned to the operating frequency of the transmitter 15 and demodulates the received signal to recover the code strings. The actual location and alert code strings are extracted by code extraction circuitry 22. Code comparator circuitry 23 compare the received location code string with the location code set by the user on the code set circuitry 5 and, if a match is detected, activates the alarm device 6 in accordance with the content of the alert code string. The alert code string may represent a scale of severity of alerts or an "all clear" signal which indicates that the emergency has passed.

Figure 2:
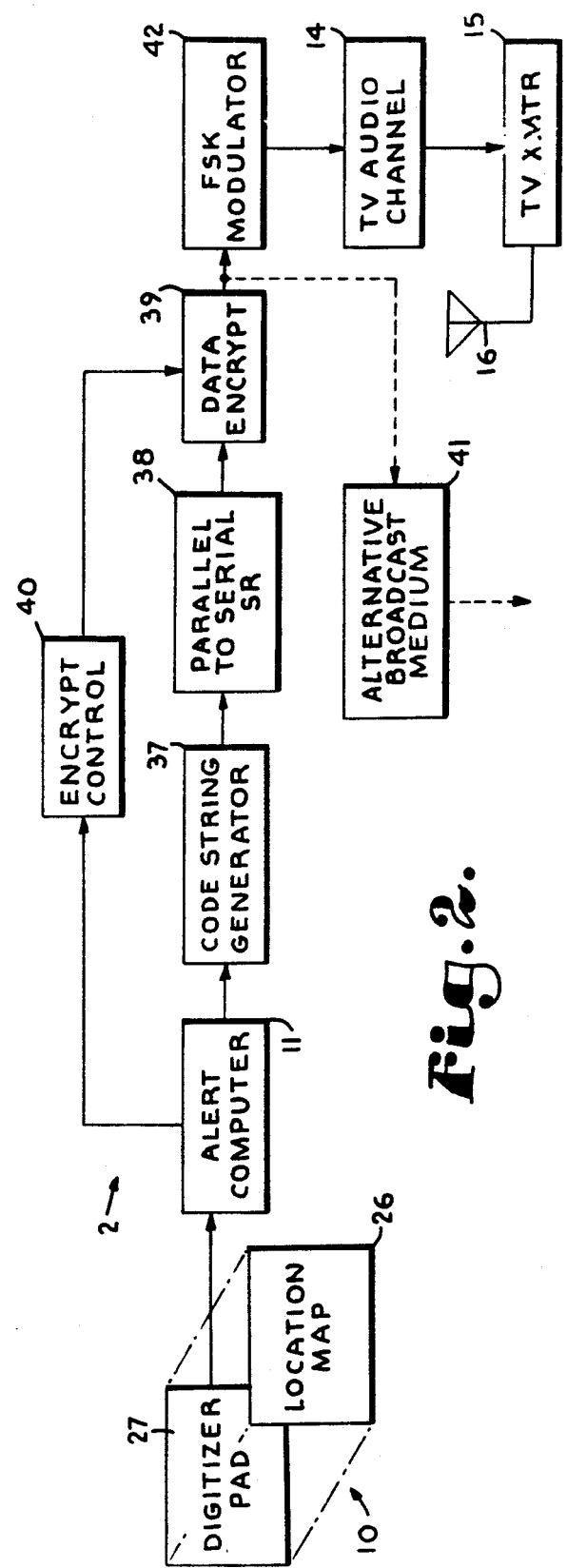
FIG. 2 is a block diagram of a code generator unit of the emergency alert system.

Referring to FIGS. 2 and 7, the selection device 10 may be as simple as a keyboard or keypad (not shown) of the alert computer 11, but is preferably a graphic selection device in which a location map 26 displays a map of the geographic areas 4 covered by the system 1. One type of graphic selection device 10 includes a digitizer pad 27 on which the location map 26 is overlaid. The digitizer pad 27 is a conventional type of digitizer pad, as is used in computer aided drafting (CAD) and other computerized graphic arts, and includes a two dimensional array of digitizer regions (not shown), each of which is associated with a pair of coordinates. The pad 27 may be of the tactile type in which the digitizer regions are activated by touching same, as by a stylus or the like, or may employ other technologies. The digitizer pad 27 is interfaced with the alert computer 11 which is programmed to interpret the activation of individual digitizer regions or ranges of such regions.

FIG. 7 illustrates an exemplary location map 26 overlaid on a digitizer pad 27. The location map 26 is divided into a large map window 28 and a smaller control window 29. The map window 28 displays a plurality of geographic areas 4 which are preferably postal delivery zones. A unique location code number 30 appears in each area 4 to identify the area 4. The illustrated location code numbers 30 are postal delivery zone numbers, commonly known as ZIP codes or five digit ZIP codes. The use of ZIP codes is preferred in the system 1 since these numbers are already assigned and generally well known to residents within the areas 4. Alternatively, other types of generally geographically based code numbers could be employed, such as telephone area codes plus telephone number prefixes, voting precincts, city council districts, school districts, rural fire protection districts, assigned Cartesian coordinates of standard maps, or the like. On the map window 28, the areas 4 are defined by area border lines 31. The control window 29 of the location map 26 may include alert-type indicia 32 representing types of alerts, such as tornado, thunderstorm (T/STORM), flash flood (F/FLOOD); alert severity indicia 33 indicating the severity of condition being alerted for, such as a watch or warning; and control indicia 34 such as "send" to initiate a type of alert and "clear" to cancel a previously issued alert. In upgrading from a less severe alert condition to a more severe alert condition or downgrading from more severe to less severe, it is necessary to send an "all clear" to the affected area 4 to reset the circuitry in the receiver units 2 set to the location codes of the affected areas 4.

In setting up the code generator unit 2, it may be initially necessary to input the graphic information displayed on the location map 26 for proper interpretation by the alert computer 11. This may be done, for example, by tracing the border lines 31 of the map window 28 and by tracing about the indicia 32-34 of the control window 29 in cooperation with a program executing within the alert computer 11 and a keyboard (not shown) thereof. Preferably, predefined map data is loaded into the alert computer 11. In operation of the system 1, the location map 26 can be superimposed on a radar plot of a storm system using standard video techniques and the image broadcast to coordinate severe storm cells with the areas 4 and to provide graphic information of the alert conditions to the viewers. Whenever alerts are issued, it is generally advisable that owners of receiver units 3 turn on their televisions sets and tune to the television station to which their receiver units 3 are also tuned. Areas 4 in which severe activity is occurring are touched along with the warning indicia 33 and the send indicia 34 to issue warning condition alerts while areas 4 into which the cells are tracking are touched along with the watch indicia 33 and the send indicia 34 to issue watch condition alerts. As the storm or emergency progresses, areas 4 may be cleared by touching the affected areas along with the clear indicia 34 to issue "all clear" signals. As will be detailed below, an "all clear" causes the receiver units 3 in the specified area to reset to a clear condition.

In selecting the areas 4 affected by an alert condition such as a storm system, it is not necessary that the weather reporter individually touch each area 4 on the location map 26. The currently affected areas 4 may, for example, be outlined while software within the alert computer 11 detects the crossing of area borders 31 to determine areas 4 to be alerted. A projected storm track may be drawn in a similar manner on the map 26 with the alert computer 11 detecting areas 4 to be issued storm watches. It is also foreseen that the location and alert selection capability of the system 1 may be integrated with radar data of a storm system to provide for automatic selection of alert locations and severity of alerts. In such an automatic selection system, it would be advisable to provide visual indications of the areas and alert types selected, such as by color coding and blinking alerted areas and to provide manual override to correct for possible anomalies in the radar data.

In addition to the digitizer pad 27, it is foreseen that other types of graphics based selection devices may be employed in the system 1, such as mice, trackballs, light pens, joysticks, Touchscreens (Dorman-Bogdonoff Corp.) overlaid on video displays, and the like, as would occur to those skilled in computer graphics. Such other types of graphics based selection devices 10 are intended to be encompassed within the present invention.

Referring to FIG. 2, the alert computer 11 interprets the activation of digitizer regions on the digitizer pad 27 and outputs sequences of location code strings and alert code strings to a code string generator circuit 37. The code string generator 37 controls the transmission of the code strings through further circuitry of the code generator unit 2 and signals the alert computer 11 that a given composite code string, that is, a combination of a location code string and an alert code string, has been transmitted the required number of times and that the code string generator 37 is ready to accept the next composite code string. As will be detailed below, circuitry within the receiver unit 3 requires that a valid location code and alert code be received a selected number of times within a certain time window before the alarm 6 is activated. In order to meet this requirement it is necessary to transmit the same code a greater number of times to compensate for code strings which might be altered in propagation due to noise and the like. For example, the receiver unit 3 might require that two successive valid code string sets be received and, to facilitate meeting this requirement, each composite code string is sent four times by the code string generator 37.

The composite code string is converted from a parallel format to a serial format in a parallel to serial shift register 38. In order to further reduce the possibility of false alarms from pranksters and the like, the composite code string may be encrypted in data encryption circuitry 39. The encryption algorithm may be of a type in which a key is periodically changed and broadcast or is broadcast as a prefix to the alert broadcast such that it is not necessary for the receiver users to concern themselves with any settings on their receiver units 3. The encryption key may be communicated to the data encryption circuitry 39 by way of encryption control circuitry 40 interfaced between the alert computer 11 and the encryption circuitry 39. Alternatively, the encryption key may be preset and incorporated into the receiver unit 3 in a manner which is difficult to discover. Under some circumstances and in some locales, it may be unnecessary or undesirable to encrypt the composite code string.

The code generator unit 2 may employ any appropriate broadcast medium and modulation scheme. In the illustrated system 1, the broadcast medium is the audio channel 14 of a television signal which, in standard television systems, is a frequency modulated carrier. Alternatively, other media can be employed, such as FM radio, cable television, telephone systems, AM radio, and the like. Frequency modulated broadcast methods are preferred because of their relative immunity to atmospheric noise, which may be considerable during a thunderstorm, for example. In the illustrated code generator unit 2, frequency shift keying (FSK) circuitry 41 is used to frequency modulate the television audio carrier using the encrypted composite code string. Thus, the television audio carrier is frequency shifted between frequencies representing zeros and ones in the encrypted composite code string.

The FSK modulator 42 additionally provides data framing bits, such as start, stop, and parity bits. FSK modulation techniques may be employed for relatively low baud rates, such as from 300 to about 1200 baud. At 1200 and higher baud rates, other modulation techniques may be more appropriate, such as phase shift keying (PSK) or the like. Even though the FSK modulator circuitry 42 is only operated in a modulator mode in the code generator unit 2, conventional modem circuitry and chip sets may be economically employed since such circuitry is widely available. The FSK modulated television audio carrier is used to energize the television broadcast antenna 16 through the television transmitter circuitry 15 and may employ an intervening microwave link (not shown) between the originating television station and a remote antenna 16.

Referring to FIG. 3, the receiver unit 3 includes the television receiver circuitry 21 which is a conventional television tuner having a channel selector 45 and a channel display 46 connected thereto. The tuner circuitry 21 demodulates the broadcast television signal and recovers therefrom the FSK modulated and encrypted composite code string. The channel selector 45 allows the circuitry 21 to be tuned to a local television channel equipped with the code generator unit 2. It is possible that more than one local channel may be so equipped. The output of the receiver circuitry 21 is connected to an FSK demodulator 47 to recover the digital bits representing the encrypted composite code string. The encrypted code string is de-encrypted by data recovery, de-encryption, and synchronizing circuitry 48 and converted back to a parallel format by a serial to parallel shift register 49. The FSK demodulator 47, de-encryption and sync circuitry 48, and shift register 49 are all synchronized by a clock signal from a master clock 50, as is other circuitry within the receiver unit 3. The circuitry of the FSK demodulator 47 is similar to the FSK modulator 42 of the code generator unit 2 and is essentially modem circuitry operated only in a demodulate mode. The de-encryption circuitry 48 is compatible with the encryption circuitry 39 and preferably requires no user intervention for proper operation. The de-encryption circuitry 48 strips data framing bits from the de-encrypted code string and outputs the original composite code string to the shift register 49.

Should an alert system 1 in a given locality employ a broadcast medium 41 other than a television audio channel, the receiver unit 3 may be equipped with alternative broadcast signal input circuitry 53 and alternative broadcast signal demodulation circuitry 54 to recover the encrypted composite code string. Such alternative circuitry 53 and 54 would be compatible with the broadcast medium 41 employed.

The receiver unit 3 is provided with the user set location code circuitry 5, which may take the form of switches of some sort such as decade thumbwheel switches, DIP (dual-in-line package) switches or an equivalent. The location code set by the user and the user set alternative alert settings are compared with the received composite code string in a data comparator and buffer 57 which, in the illustrated receiver unit 3, incorporates exclusive-OR logic to detect bit pattern anticoincidences (or in practical terms, bit pattern coincidences, depending on the desired output polarity). Alternatively, other types of digital logic circuitry could be employed. The receiver unit 3 has the capability of allowing the user to be alerted to other conditions and situations besides severe weather, and the data comparator 57 has additional user switches 58 for this purpose. Additionally, self test circuitry 59 is connected to the data comparator 57 and the FSK demodulator 47 to allow the user to simulate an alert to test the operability of the receiver unit 3.

When the data comparator 57 detects that the received composite code matches user set codes, the alert code string is sent to valid word decode and alarm power enable circuitry 61. The circuitry 61 is connected to flashing LED (light emitting diode) circuitry 62 and a primary timer 63 and may also e connected to a slave transmitter 64 which will be detailed further below and which, if present, has a slave transmitter antenna 65 connected thereto. The circuitry 61, in cooperation with the data comparator circuitry 57, functions to count the predetermined required number of composite code matches and, when the requirement is met, decodes the alert code string to control the state of activation of the LED circuitry 62 and the primary timer 63. The alert code string must be a valid alert code for activation of the alarm circuitry 6 to be activated or deactivated. The circuitry 61 may also have an accessory input/output interface 66 connected thereto for integration of the receiver unit 3 with an existing system in the home, such as a home security system (not shown) as will be detailed more fully below.

The primary timer 63 is connected to a secondary timer 67 and a two-tone audible alarm generator 68. The alarm generator 68 is connected through a user operable audio toggle 69 and a power amplifier 70 to a speaker 71. The primary timer 63 is activated by the enable signal from the circuitry 61 to enable an audible alarm for a selected period of time, such as ten minutes. When the primary timer 63 times out, the secondary timer 67 is activated. The primary timer 63 causes a continuous two-tone alarm to be sounded while the secondary timer 67 causes a periodic short alarm (for example, for two seconds each minute) until an 37 all clear" is received. The user may silence the audible alarm by operation of the audio toggle 69. However, the LED circuitry 62 continues to operate until an "all clear" alert code string is decoded and cannot be interrupted by the user. Once the alarm circuitry 6 has been activated by an alert of a given type, it is necessary for an "all clear" alert code string to be validly received before upgrading to or downgrading to a different alert type. The "all clear" code string also causes the audio toggle 69 to be reset to prepare the receiver unit 3 for a subsequent alarm. The LED circuitry 62 may include multiple LED's to indicate different types of alert conditions. For example, a flashing red LED might indicate a warning condition, a steady yellow LED might indicate a watch condition, and green LED temporarily illuminated after an alert condition indicate an "all clear" condition. Similarly, the alarm generator 68 may be provided with the capability of generating different sounding tones to indicate different types or severities of alerts. Alternatively, the receiver unit 3 may be provided with an alphanumeric readout (not shown) which is connected to the circuitry 61 and which includes logic circuitry to spell out the alert type or severity.

FIG. 4 illustrates alternative front end circuitry 75 for a receiver unit 3 which has the capability to tune the receiver unit 3 to an alternate code generator unit 2 should a primary code generator unit be incapacitated, such as by a lightning strike on the transmitter antenna 16. The circuitry 75 includes a receiver antenna 76 connected to television audio signal detection circuitry 77 which includes a radio frequency amplifier, an audio intermediate frequency antenna, and an FM detector. The detector 77 has a data signal output 78 which is connected to an FSK demodulator or other type of demodulator and an audio carrier output connected to audio carrier detection circuitry 79. The carrier detect circuit 79 is connected to automatic channel selection circuitry 80. The channel selection circuitry 80 includes a memory and is connected to a channel display 81 and has a channel selector 82 connected thereto which allows a user to input a main alert channel and one or more backup channel selections. The channel circuitry 80 is connected to and controls the tuning of the detector circuitry 77.

Normally, the channel selection circuitry 80 causes the detector 77 to tune to the television channel of the main alert channel. In the event that the carrier detect circuitry 79 senses the loss of the audio carrier from the main alert channel, the channel selection circuitry 80 automatically causes detector 77 to tune to an alternate alert channel. Many areas have multiple television stations, and more than one may provide alerts using code generator units 2 of the system 1. While one station may be knocked off the air during an emergency, it is improbable that more than one will be incapacitated at the same time. Thus, the alternative front end 75 provides a receiver unit 3 with an increased capability to receive alerts during emergencies.

FIG. 5 illustrates a slave receiver unit 85 which may be used in cooperation with a receiver unit 3 of the system 1. One or more slave units 85 can be used with and under the control of a receiver unit 3 to extend the alert capabilities to remote areas of a physical plant, such as a large home, ranch, farm, school, hospital, manufacturing plant, or the like. The slave unit 85 includes a slave receiver antenna 86 connected to a slave receiver and alarm power enable circuit 87. The circuit 87 is connected to a primary timer 88, a secondary timer 89, and flashing LED circuitry 90. The timers 88 and 89 are connected to an audible alarm generator 91, an audio toggle 92, an alarm power amplifier 93, and a speaker 94. The elements of the circuitry 88-94 is similar to corresponding elements in the main receiver unit 3 and cooperate in a similar manner.

The slave transmitter 64 of the main receiver unit 3 and the receiver circuitry 87 of the slave unit 85 are preferably of a low power FM radio control type and may be similar in many respects to the types of units employed in such devices as radio controlled garage door openers. Activation of alarm power by the circuitry 61 of the main receiver unit 3 causes the slave transmitter 64 to transmit a slave control signal, which may be coded. Reception of the slave control signal by the receiver circuitry 87 of the slave unit 85 enables power to the timers 88 and 89 and the LED circuitry 90. The slave receiver circuitry 87 may be configured to operate in a toggle manner such that when the main receiver unit 3 receives an "all clear" broadcast, the slave transmitter 64 again transmits the coded slave control signal which, when received by the slave receiver circuitry 87 during a power enabled condition, causes the slave receiver circuitry 87 to inhibit power to the alarm elements 88-94, thereby causing them to reset to inactive states.

The slave receiver unit 85 may be provided with an input/output interface 95, which is connected to the slave receiver and alarm power enable circuitry 87, to allow the slave unit 85 to be integrated into an existing security system (not shown) or to allow the slave unit 85 to control accessories 96 in response to the reception of an alert. For example, the slave unit 85 may receive signals from sensors and logic circuitry of such a security system and function as a primary or secondary alarm device. Similarly, the slave unit 85 may output control signals to control the functioning of accessory devices 96 in response to an emergency, such as to turn on selected lights, release or lock selected windows and doors, turn off selected operating machinery, or the like. The interface 66 may be provided on the main receiver unit 3 to cooperate with accessory devices in a similar manner without the use of a slave unit 85, such as in a smaller dwelling.

FIG. 6 illustrates a battery backed power supply 100 for powering a main receiver unit 3 or a slave receiver unit 85. Normally, the receiver units 3 and 85 are powered from an AC line 101 through a twelve volt DC adaptor 102 and a five volt regulator 103. Since emergencies such as thunderstorms can cause the loss of power from the AC line 101, the power 100 is provided with a nine volt battery backup module 104, including a common type of nine volt battery (not shown), to assure that the receiver units 3 and 85 are capable of receiving alerts in such an eventuality. The module 104 preferably has a low battery indicator 105 to inform the user when the battery requires replacing. The module 104 may also be provided with an input 106 to allow the power supply 100 to be connected to an accessory twelve volt system, such as of an automobile, recreational vehicle, boat, or the like to provide for alert reception in mobile situations. It should be understood that if a receiver unit 3 is moved to a new location, the user must input the local location code for the new are for the receiver unit to receive alerts directed to the new location.

While the system 1 has been described primarily in terms of metropolitan-wide coverage and the initiation of weather emergency alerts by broadcasting station personnel, the system 1 may also be set up as a national, regional, or statewide system with access to broadcast location specific alerts related to a wide variety of emergency conditions by government authorities, public safety agencies, fire departments, police departments, the Coast Guard, military authorities, and other agencies.

It is to be understood that while certain forms of the present invention have been illustrated and described herein, it is not to be limited to the specific forms or arrangement of parts described and shown.

What is claimed and desired to be secured by Letters Patent is as follows:

1. A geographically specific signal communication system comprising:
    (a) location encoding means operable to select at least one of a plurality of geographic areas and to generate a location code signal component;
    (b) communication signal means operable to generate a communication signal component;
    (c) broadcast means having said location encoding means and said communication signal means coupled thereto and generating a broadcast signal including said location code signal component and said communication signal component;
    (d) receiver means positioned in one of said geographic areas and configured to receive said broadcast signal and extract said location code signal component and said communication signal component therefrom;
    (e) communication signal processor means coupled to said receiver means and operable, when activated, to process said communication signal component;
    (f) location code set means coupled to said receiver means and enabling user entry of a location code corresponding to one of said geographic areas; and
    (g) location decode means coupled to said receiver means and cooperating with said code set means to process said location code signal component to determine if it corresponds to the user entered location code and, if so, activating said communication processor means to process said communication signal component.

2. A system as set forth in claim 1 wherein:
    (a) said communication signal means is operative to generate an alert code string; and
    (b) said communication signal processor means is operative to generate an alarm signal when activated.

3. A system as set forth in claim 1 and including:
    (a) encryption means coupling said location encoding means and said communication signal means to said broadcast means and operative to encrypt said location code signal and communication signal components; and
    (b) de-encryption means coupling said receiver means to said communication signal processor means and said location decode means and operative to de-encrypt said location code signal and communication signal components.

4. A system as set forth in claim 1 wherein:
    (a) said broadcast means includes audio channel circuitry of a standard television transmitter circuit; and
    (b) said receiver means includes standard television receiver circuitry with television audio signal demodulation capability.

5. A system as set forth in claim 1 and including:
    (a) slave transmitter means coupled to said communication signal processor means and activated to transmit a slave communication signal upon said communication signal processor mean being activated; and
    (b) slave receiver means positioned remote from said slave transmitter means and including slave communication signal processor means which is activated upon said slave receiver means receiving said slave communication signal.

6. A system as set forth in claim 1 and including:
    (a) said location encoding means including means for graphically selecting at least one of said geographic areas; and
    (b) said communication signal means including means for graphically selecting a type of communication signal for broadcast.

7. A system as set forth in claim 1 wherein:
    (a) said geographic areas comprise postal delivery zones;
    (b) said location encoding means generates said location code signal component which incorporates a postal delivery zone code number corresponding to a selected area; and
    (c) said location code set means is configured to enable user entry of a postal delivery zone code number thereinto.

8. A system as set forth in claim 1 wherein:
    (a) said location encoding means, said communication signal means, and said broadcast means form a first signal source broadcasting a first broadcast signal on a first broadcast frequency;

(b) said system includes a second signal source substantially similar to said first signal source and operating at a second broadcast frequency;
(c) said receiver means includes tuner means tunable at least to said first and second broadcast frequencies;
(d) said receiver means includes carrier detect means connected to said tuner means and outputting a carrier detect signal upon detecting said first broadcast signal; and
(e) said receiver means includes automatic tuner control means connected to said carrier detect means and said tuner means; said control means normally causing said tuner means to be tuned to said first broadcast frequency and, upon failing to receive said carrier detect signal, causing said tuner means to be tuned to said second broadcast frequency.

9. An emergency warning system comprising:
(a) location select means operable to select at least one of a plurality of geographic areas;
(b) alert select means operable to select a type of alert condition;
(c) code generator means having said location select means and said alert select means coupled thereto combining a location code string corresponding to the geographic area selected by said location select means and an alert code string corresponding to the type of alert condition selected by said alert select means;
(d) broadcast means having said code generator means coupled thereto and broadcasting a broadcast signal incorporating said composite code string;
(e) at least one alert receiver means positioned in one of said geographic areas and operative to receive said broadcast signal and extract said composite code string therefrom;
(f) alarm means coupled to said receiver means and operative, when activated, to process said alert code string and generate an alarm signal;
(g) said receiver means including location code set means enabling use entry of a location code corresponding to one of said geographic areas; and
(h) location decode means coupling said alarm means to said receiver means and having said location code set means coupled thereto, said location decode means being operative to compare said location code string in the received composite code string with the user entered location and, upon matching, activating said alarm means to generate said alarm signal.

10. A system as set forth in claim 9 and including:
(a) encryption means coupling said code generator means to said broadcast means and operative to encrypt said composite code string; and
(b) de-encryption means coupling said receiver means to said location decode means and operative to de-encrypt said composite code string.

11. A system as set forth in claim 9 wherein:
(a) said broadcast means includes audio channel circuitry of a standard television transmitter circuit; and
(b) said receiver means includes standard television receiver circuitry with television audio signal demodulation capability.

12. A system as set forth in claim 9 wherein:

(a) said broadcast means includes frequency modulation means to frequency modulate a broadcast carrier signal using said composite code string; and
(b) said receiver means includes frequency demodulation means to recover said composite code string from said broadcast signal.

13. A system as set forth in claim 9 and including:
(a) slave transmitter means coupled to said alarm means and activated to transmit a slave communication signal upon said alarm means being activated; and
(b) slave receiver means positioned remote from said slave transmitter means and including slave alarm means which is activated upon said slave receiver means receiving said slave communication signal.

14. A system as set forth in claim 9 wherein:
(a) said location select means includes means to graphically select one of said geographic areas; and
(b) said alert select means includes means to graphically select said type of alert condition.

15. A system as set forth in claim 14 and including:
(a) alert computer means interfaced to said code generator means;
(b) a digitizer pad interfaced to said computer means and including a two dimensional array of activatable digitizer regions, each digitizer region having unique two dimensional coordinates associated therewith, said computer means detecting said coordinates upon said digitizer region being activated;
(c) a location map overlaid on said pad, said map displaying geographic map areas corresponding to said geographic areas and alert indicia representing a plurality of types of alerts;
(d) said location select means including digitizer regions overlaid respectively by said geographic map areas; and
(e) said alert select means including digitizer regions overlaid respectively by said alert indicia.

16. A system as set forth in claim 9 wherein:
(a) said geographic areas comprise postal delivery zones;
(b) said location select means causes said code generator means to generate said location code representing a postal delivery zone code number corresponding to a selected area; and
(c) said location code set means is configured to enable user entry of a postal delivery zone code number thereinto.

17. A system as set forth in claim 9 wherein:
(a) said location select means, said alert select means, said code generator means, and said broadcast means form a first signal source broadcasting a first broadcast signal on a first broadcast frequency;
(b) said system includes a second source substantially similar to said first signal source and operating at a second broadcast frequency;
(c) said receiver means includes tuner means tunable at least to said first and second broadcast frequencies;
(d) said receiver means includes carrier detect means connected to said tuner means and outputting a carrier detect signal upon detecting said first broadcast signal; and
(e) said receiver means includes automatic tuner control means connected to said carrier detect means and said tuner means; said control means normally causing said tuner means to be tuned to said first broadcast frequency and, upon failing to receive said carrier detect signal, causing said tuner means to be tuned to said second broadcast frequency.

18. An emergency warning receiver unit for receiving broadcast signal incorporating a composite code string including a location code string representing one of a plurality of geographic areas and an alert code string representing a type of alert, said receiver comprising:
   (a) broadcast signal demodulation means operative to receive said broadcast signal and extract said composite code string therefrom;
   (b) alarm means coupled to said demodulation means and operative, when activated, to process said alert code string and generate an alarm signal;
   (c) location code set means coupled to said demodulation means and enabling user entry of a location code corresponding to one of said geographic areas; and
   (d) location decode means coupled with said demodulation means and said location code set means and operative to compare said location code string in the received composite code string with the user entered location code and, upon matching, activating said alarm means to generate said alarm signal.

19. A unit as set forth in claim 18 wherein said composite code string is encrypted prior to broadcasting, and including:
   (a) de-encryption means coupling said receiver means to said location decode means and operative to de-encrypt said composite code string.

20. A system as set forth in claim 18 wherein said broadcast signal is an audio portion of a standard television broadcast signal and wherein:
   (a) said demodulation means includes standard television receiver circuitry with television audio signal demodulation capability.

21. A system as set forth in claim 18 and including:
   (a) slave transmitter means coupled to said alarm means and activated to transmit a slave communication signal upon said alarm means being activated; and
   (b) slave receiver means positioned remote from said slave transmitter means and including slave alarm means which is activated upon said slave receiver means receiving said slave communication signal.

22. A system as set forth in claim 18 wherein said geographic areas comprise postal delivery zones and said location code represents a postal delivery zone code number corresponding to a selected area, and wherein:
   (a) said location code set means is configured to enable user entry of a postal delivery zone code number thereinto.

23. A system as set forth in claim 18 wherein said broadcast signal includes a first broadcast signal at a first broadcast frequency and an independent second broadcast signal at a second broadcast frequency, and including:
   (a) tuner means tunable at least to said first and second broadcast frequencies;
   (b) carrier detect means connected to said tuner means and outputting a carrier detect signal upon detecting said first broadcast signal; and
   (c) automatic tuner control means connected to said carrier detect means and said tuner means; said control means normally causing said tuner means to be tuned to said first broadcast frequency and, upon failing to receive said carrier detect signal, causing said tuner means to be tuned to said second broadcast frequency.

* * * * *

UNITED STATES PATENT AND TRADEMARK OFFICE
CERTIFICATE OF CORRECTION

PATENT NO. : 5,121,430

DATED : June 9, 1992

INVENTOR(S) : Larry R. Ganzer, Michael A. Fessler and Daric G. Laughlin

It is certified that error appears in the above-identified patent and that said Letters Patent is hereby corrected as shown below:

On the title page, item (57) Abstract, line 3, delete "of" and substitute --or--.

COLUMN 13, Claim 9, Paragraph (c), line 2, after "thereto" please insert --and operative to generate a composite code string--.

COLUMN 15, Claim 18, LINE 2, after "ing" please insert --a--.

Signed and Sealed this

Twenty-eighth Day of September, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,121,430 C2
DATED : September 10, 2002
INVENTOR(S) : Larry R. Ganzer et al.

It is certified that error appears in the above-identified patent and that said Letters Patent is hereby corrected as shown below:

Column 11,
Line 51, correct claim 1, paragraph (a) to read:

(a) location encoding means operable to select at least one of a plurality of geographic areas and to generate a location code signal component corresponding to at least one selected geographic area;

Line 56, correct claim 1, paragraph (c) to read:

(c) television broadcast and/or FM radio broadcast and/or AM radio broadcast media having said location encoding means and said communication signal means coupled thereto and generating a broadcast signal on an existing broadcast frequency upon which is broadcast information which is normally unrelated to the location code signal component or the alert communication signal component, which broadcast signal is modified to include said location code signal component and said alert communication signal component *by replacing a standard audio portion of said broadcast signal by an alert audio portion which uses a frequency modulated technique;*

Column 12, line 64 through Column 13, line 27,
Add claim 8 to read:

8. A system as set forth in claim 1 wherein:
   (a) said location encoding means, said alert communication signal means, and said broadcast media form a first signal source broadcasting a first broadcast signal on a first broadcast frequency;
   (b) said system includes a second broadcast media forming a second signal source substantially similar to said first signal source and broadcasting a second broadcast signal operating at a second existing broadcast frequency upon which is also broadcast information which is unrelated to the location code signal component and the alert communication signal component, which second broadcast signal is also modified to include said location code signal component and said alert communication signal component;

UNITED STATES PATENT AND TRADEMARK OFFICE
CERTIFICATE OF CORRECTION

PATENT NO. : 5,121,430 C2
DATED : September 10, 2002
INVENTOR(S) : Larry R. Ganzer et al.

It is certified that error appears in the above-identified patent and that said Letters Patent is hereby corrected as shown below:

<u>Column 12, line 64 through Column 13, line 27 (cont'd),</u>

```
(c)   said receiver means includes tuner means tunable
      at least to said first and second broadcast
      frequencies;
(d)   said receiver means includes carrier detect means
      connected to said tuner means and outputting a
      carrier detect signal upon detecting said first
      broadcast signal; and
(e)   said receiver means includes automatic tuner
      control means connected to said carrier detect
      means and said tuner means; said control means
      normally causing said tuner means to be tuned to
      said first broadcast frequency and, upon failing
      to receive said carrier detect signal, causing
      said tuner means to be tuned to said second
      broadcast frequency.
```

Signed and Sealed this

Seventh Day of October, 2003

JAMES E. ROGAN
*Director of the United States Patent and Trademark Office*

REEXAMINATION CERTIFICATE (3618th)

United States Patent [19]
Ganzer et al.

[11] B1 5,121,430
[45] Certificate Issued Sep. 1, 1998

[54] STORM ALERT FOR EMERGENCIES

[75] Inventors: Larry R. Ganzer, Overland Park, Kans.; Michael A. Fessler, Grandview, Mo.; Daric G. Laughlin, Overland Park, Kans.

[73] Assignee: Quad Dimension, Inc., Kansas City, Mo.

Reexamination Request:
No. 90/004,669, Jul. 15, 1997

Reexamination Certificate for:
Patent No.: 5,121,430
Issued: Jun. 9, 1992
Appl. No.: 657,502
Filed: Feb. 19, 1991

Certificate of Correction issued Sep. 28, 1993.

[51] Int. Cl.$^6$ .................. H04L 9/00; H04N 7/08; G08B 5/22; H04B 7/00
[52] U.S. Cl. .................. 380/48; 348/9; 348/473; 348/552; 380/23; 340/825.44; 455/38.2
[58] Field of Search .................. 455/38.2; 340/825.44; 380/48, 49, 23; 348/9, 473, 552

[56] References Cited

U.S. PATENT DOCUMENTS

| | | |
|---|---|---|
| 3,653,031 | 3/1972 | Hlady et al. . |
| 4,155,042 | 5/1979 | Permut et al. . |
| 4,476,488 | 10/1984 | Merrell . |
| 4,847,604 | 7/1989 | Doyle . |
| 4,956,875 | 9/1990 | Bernard et al. ............... 455/38.2 |
| 5,073,972 | 12/1991 | Tendler et al. . |

OTHER PUBLICATIONS

HollyAnne Press Conference Material, Saturday, Apr. 30, 1988, Los Angeles Convention Center Room 216.

*Primary Examiner*—David C. Cain

[57] ABSTRACT

A geographically specific emergency alert system includes a code generator unit in which geographic areas to be alerted and types or severity of alerts are selected and code strings generated to represent the affected areas and alert types selected. The code strings are broadcast by modulating the audio carrier of a television signal and received on receiver units positioned in areas within the broadcast market of a television station providing the alerting service. Location codes or entered into the receiver units by the users according to the areas in which the receiver units are used. When an alert is broadcast, each receiver unit decodes a location code string in the signal. If it matches that set on the receiver, an alert code string is decoded to activate a alarm devices connected to the receiver, such as an audible alarm generator, LED, etc., in accordance with the type or severity of alert that was broadcast.

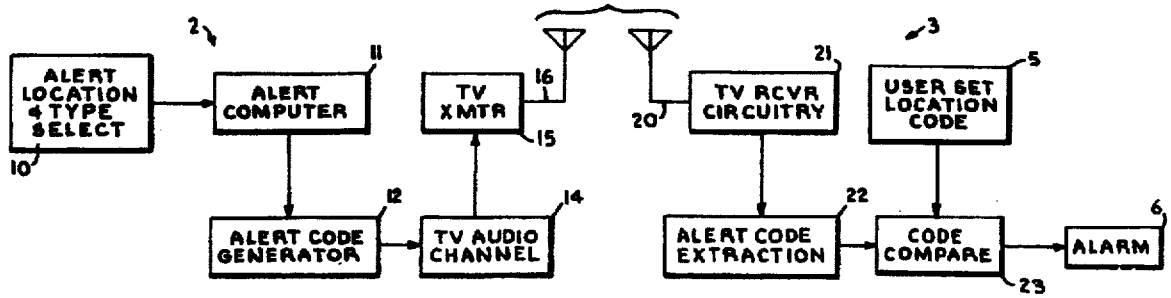

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 8, 9, 11, 18, 20, 21, 22 and 23 are determined to be patentable as amended.

Claims 2, 3, 5, 6, 7, 10, 12–17 and 19, dependent on an amended claim, are determined to be patentable.

New claims 24, 25 and 26 are added and determined to be patentable.

1. A geographically specific signal communication system comprising:
 (a) location encoding means operable to select at least one of a plurality of geographic areas and to generate a location code signal component;
 (b) communication signal means operable to generate [a] *an alert* communication signal component;
 (c) *television broadcast and/or FM radio broadcast and/ or AM radio* broadcast [means] *media* having said location encoding means and said communication signal means coupled thereto and generating a broadcast signal [including] *on an existing broadcast frequency upon which is broadcast information which is unrelated to the location code signal component and the alert communication signal component, which broadcast signal is modified to include* said location code signal component and *alert* communication signal component;
 (d) receiver means positioned in one of said geographic areas and configured to receive said *modified* broadcast signal and extract said location code signal component and said *alert* communication signal component therefrom;
 (e) *alert* communication signal processor means coupled to said receiver means and operable, when activated, to process said *alert* communication signal component;
 (f) location code set means coupled to said receiver means and enabling user entry of a location code corresponding to one of said geographic areas; and
 (g) location decode means coupled to said receiver means and cooperating with said code set means to process said location code signal component to determine if it corresponds to the user entered location code and, if so, activating said communication processor means to process said *alert* communication signal component.

4. A system as set forth in claim 1 wherein:
 (a) said *television* broadcast [means] *media* includes audio channel circuitry of a standard television transmitter circuit *via which said location code signal component and said alert communication signal component are incorporated into an audio portion of a standard television broadcast signal*; and
 (b) said receiver means includes standard television receiver circuitry with television audio signal demodulation capability, *said receiver means demodulating said location code signal component and said alert communication signal component from said audio portion of said standard television broadcast signal.*

8. A system as set forth in claim 1 wherein:
 (a) said location encoding means, said *alert* communication signal means, and said broadcast [means] *media* form a first signal source broadcasting a first broadcast signal on a first broadcast frequency;
 (b) said system includes a second *broadcast media forming a second* signal source substantially similar to said first signal source and *broadcasting a second broadcast signal* operating at a second *existing* broadcast frequency *upon which is also broadcast information which is unrelated to the location code signal component and the alert communication signal component, which second broadcast signal is also modified to include said location code signal component and said alert communication signal computer*;
 (c) said receiver means includes tuner means tunable at least to said first and second broadcast frequencies;
 (d) said receiver means includes carrier detect means connected to said tuner means and outputting a carrier detect signal upon detecting said first broadcast signal; and
 (e) said receiver means includes automatic tuner control means connected to said carrier detect means and said tuner means; said control means normally causing said tuner means to be tuned to said first broadcast frequency and, upon failing to receive said carrier detect signal, causing said tuner means to be tuned to said second broadcast frequency.

9. An emergency warning system comprising:
 (a) location select means operable to select at least one of a plurality of geographic areas;
 (b) alert select means operable to select a type of alert condition;
 (c) code generator means having said location select means and said alert select means coupled thereto and operative to generate a composite code string combining a location code string corresponding to the geographic area selected by said location select means and an alert code string corresponding to the type of alert condition selected by said alert select means;
 (d) *television broadcast and/or FM radio broadcast and/ or AM radio* broadcast [means] *media* having said code generator means coupled thereto and [broadcasting] *generating* a broadcast signal [incorporating] *on an existing broadcast frequency upon which is broadcast information which is unrelated to the geographic areas or the alert condition, which broadcast signal is modified to incorporate* said composite code string;
 (e) at least one alert receiver means positioned in one of said geographic areas and operative to receive said *modified* broadcast signal and extract said composite code string therefrom;
 (f) alarm means coupled to said receiver means and operative, when activated, to process said alert code string and generate an alarm signal;
 (g) said receiver means including location code set means enabling [use] *user* entry of a location code corresponding to one of said geographic areas; and
 (h) location decode means coupling said alarm means to said receiver means and having said location code set means coupled thereto, said location decode means being operative to compare said location code string in the received composite code string with the user entered location and, upon matching, activating said alarm means to generate said alarm signal.

11. A system as set forth in claim 9 wherein:

(a) said *television* broadcast [means] *media* includes audio channel circuitry of a standard television transmitter circuit *in which said composite code string is incorporated into an audio portion of a standard television broadcast signal*; and (b) said receiver means includes standard television receiver circuitry with television audio signal demodulation capability, *said receiver circuitry demodulating said composite code string from said audio portion of said standard television broadcast signal.*

18. An emergency warning receiver unit for receiving a broadcast signal [incorporating] *on an existing broadcast frequency from television broadcast and/or FM radio broadcast and/or AM radio broadcast media, which broadcast signal includes information which is unrelated to location code or alert conditions, the broadcast signal being modified to incorporate* a composite code string including a location code string representing one of a plurality of geographic areas and an alert code string representing a type of alert condition, said receiver comprising:

(a) broadcast signal demodulation means operative to receive said *modified* broadcast signal and extract said composite code string therefrom;

(b) alarm means coupled to said demodulation means and operative, when activated, to process said alert code string and generate an alarm signal;

(c) location code set means coupled to said demodulation means and enabling user entry of a location code corresponding to one of said geographic areas; and (d) location decode means coupled with said demodulation means and said location code set means and operative to compare said location code string in the received composite code string with the user entered location code and, upon matching, activating said alarm means to generate said alarm signal.

20. A [system] *unit* as set forth in claim 18 wherein said broadcast signal is an audio portion of a standard television broadcast signal and wherein:

(a) said demodulation means includes standard television receiver circuitry with television audio signal demodulation [capability] *circuitry which demodulates said composite code string from said audio portion of a standard television broadcast signal.*

21. A [system] *unit* as set forth in claim 18 and including:

(a) slave transmitter means coupled to said alarm means and activated to transmit a slave communication signal upon said alarm means being activated; and (b) slave receiver means positioned remote from said slave transmitter means and including slave alarm means which is activated upon said slave receiver means receiving said slave communication signal.

22. A [system] *unit* as set forth in claim 18 wherein said geographic areas comprise postal delivery zones and said location code represents a postal delivery zone code number corresponding to a selected area, and wherein:

(a) said location code set means is configured to enable user entry of a postal delivery zone code number thereinto.

23. A [system] *unit* as set forth in claim 18 wherein said *modified* broadcast signal includes a first broadcast signal *from a first television or radio medium* at a first *existing* broadcast frequency *which first broadcast signal includes information which is unrelated to said alert condition, the first broadcast signal being modified to incorporate said composite code string* and an independent second broadcast signal *from a second television or radio medium* at a second *existing* broadcast frequency *which second broadcast signal also includes information which is unrelated to said alert condition, the second broadcast signal also being modified to incorporate said composite code string*, and including:

(a) tuner means tunable at least to said first and second broadcast frequencies;

(b) carrier detect means connected to said tuner means and outputting a carrier detect signal upon detecting said first broadcast signal; and (c) automatic tuner control means connected to said carrier detect means and said tuner means; said control means normally causing said tuner means to be tuned to said first broadcast frequency and, upon failing to receive said carrier detect signal, causing said tuner means to be tuned to said second broadcast frequency.

24. *A system as set forth in claim 1 wherein said alert communication signal component includes code indicating one or more of a plurality of alert conditions including an "all clear" condition.*

25. *A system as set forth in claim 9 wherein said alert conditions selectable by said alert select means include an "all clear" condition with said all clear condition being encoded into said alert code string when it is selected by said alert select means.*

26. *A system as set forth in claim 18 wherein the types of alert conditions which can be indicated by said alert code string and demodulated by said broadcast signal demodulation means include an "all clear" condition.*

* * * * *

US005121430C2

(12) REEXAMINATION CERTIFICATE (4642nd)

United States Patent
Ganzer et al.

(10) Number: US 5,121,430 C2
(45) Certificate Issued: Sep. 10, 2002

(54) STORM ALERT FOR EMERGENCIES

(75) Inventors: Larry R. Ganzer, Overland Park, KS (US); Michael A. Fessler, Grandview, MO (US); Daric G. Laughlin, Overland Park, KS (US)

(73) Assignee: Quad Dimension, Inc., Kansas City, MO (US)

Reexamination Request:
No. 90/005,475, Sep. 3, 1999

Reexamination Certificate for:
Patent No.: 5,121,430
Issued: Jun. 9, 1992
Appl. No.: 07/657,502
Filed: Feb. 19, 1991

Reexamination Certificate B1 issued Sep. 1, 1998

Certificate of Correction issued Sep. 28, 1993.

(51) Int. Cl.$^7$ .................... H04L 9/00; H04H 1/00; H04B 10/02
(52) U.S. Cl. .................... 380/258; 380/236; 725/33; 455/404
(58) Field of Search .................... 380/258, 236; 348/9, 486, 729; 455/38.2, 404, 457, 521, 508; 340/825.44, 825.47, 825.48, 825.49; 434/217, 153; 702/3

(56) References Cited

U.S. PATENT DOCUMENTS

| 3,653,031 A | | 3/1972 | Hlady et al. |
| 3,848,193 A | * | 11/1974 | Martin et al. ............... 455/526 |
| 4,069,455 A | * | 1/1978 | Sherman, Jr. ............ 455/150.1 |
| 4,117,405 A | | 9/1978 | Martinez |
| 4,134,108 A | * | 1/1979 | Palmer et al. .............. 340/539 |
| 4,415,771 A | | 11/1983 | Martinez |
| 4,476,488 A | | 10/1984 | Merrell |
| 4,641,364 A | | 2/1987 | Bass et al. |
| 4,821,097 A | * | 4/1989 | Robbins ..................... 348/485 |
| 4,847,604 A | | 7/1989 | Doyle |
| 4,956,875 A | | 9/1990 | Bernard |
| 4,969,209 A | * | 11/1990 | Schwob ................... 455/158.4 |
| 5,030,948 A | | 7/1991 | Rush |
| 5,073,972 A | | 12/1991 | Tendler et al. |

OTHER PUBLICATIONS

Interim Report use of Commercial Broadcast Facilities, Jul. 28, 1964, for Emergency DOD Communications.
HollyAnne Press Conference Material, Saturday Apr. 30, 1988, Los Angeles Convention Center, Room 216.
Altran Proposals to FEMA and Commonwealth Edison, Feb./Mar. 1980.
Sunday Star, System for Alerts, Aug. 29, 1971.
Low Cost Home Receiver Development, Westinghouse Defense and Electronic Systems Center, May 1976.
RTNDA Communicator, "National Weather Service Dissemination Systems: Current Modes and Exciting New Possibilities," Rodney J. Becker and Edward M. Gross, Dec. 1986, pp. 11–12.
Stanford Research Institute, "The Effectiveness of Sonic Outdoor Warning Devices," Nov. 1953, pp. 1–17 and 35–36.

* cited by examiner

*Primary Examiner*—Gilberto Barrón

(57) ABSTRACT

A geographically specific emergency alert system includes a code generator unit in which geographic areas to be alerted and types or severity of alerts are selected and code strings generated to represent the affected areas and alert types selected. The code strings are broadcast by modulating the audio carrier of a television signal and received on receiver units positioned in areas within the broadcast market of a television station providing the alerting service. Location codes or entered into the receiver units by the users according to the areas in which the receiver units are used. When an alert is broadcast, each receiver unit decodes a location code string in the signal. If it matches that set on the receiver, an alert code string is decoded to activate a alarm devices connected to the receiver, such as an audible alarm generator, LED, etc., in accordance with the type or severity of alert that was broadcast.

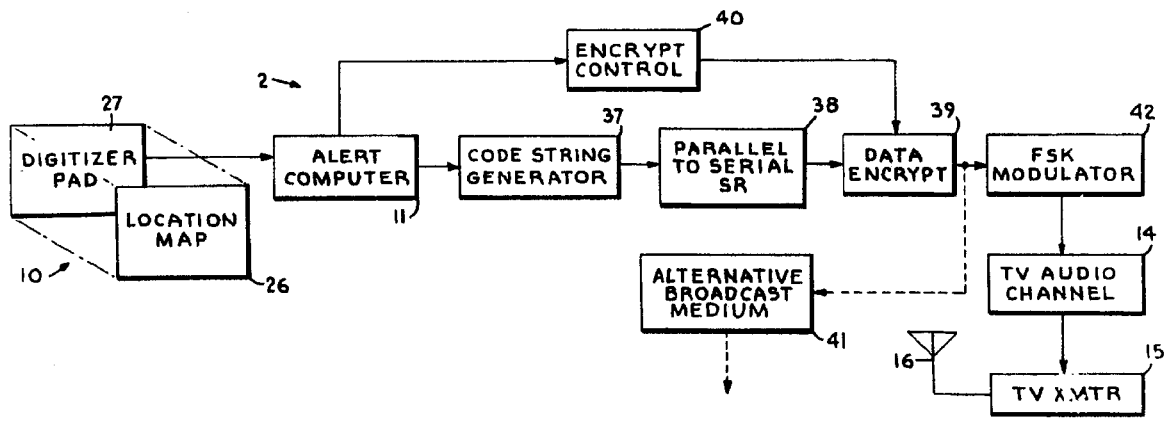

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 18 and 26 are determined to be patentable as amended.

Claims 2–8, 10–17 and 19–25, dependent on an amended claim, are determined to be patentable.

1. A geographically specific signal communication system comprising:

(a) location encoding means operable to select at least one of a plurality of geographic areas and to generate a location code signal component *corresponding to at least selected geographic area*;

(b) communication signal means operable to generate an alert communication signal component;

(c) television broadcast and/or FM radio broadcast and/or AM radio broadcast media having said location encoding means and said communication signal means coupled thereto and generating a broadcast signal on an existing broadcast frequency upon which is broadcast information which is *normally* unrelated to the location code signal component [and] *or* the alert communication signal component, which broadcast signal is modified to include said location code signal component and said alert communication signal component *by standard audio portion of said broadcast signal by an alert audio portion which uses a frequency modulated technique*;

(d) receiver means positioned in one of said geographic areas and configured to receive [said] *the* modified broadcast signal and extract said location code signal component and said alert communication signal component therefrom;

(e) alert communication signal processor means coupled to said receiver means and operable, when activated, to process said alert communication signal component;

(f) location code set means coupled to said receiver means and enabling user entry of a location code corresponding to one of said geographic areas *and user re-entry of a location code as often as needed*; and (g) location decode means coupled to said receiver means and cooperating with said *location* code set means to process said location code signal component to determine if it corresponds to the user entered location code and, if so, activating said *alert* communication *signal* processor means to process said alert communication signal component.

9. An emergency warning system comprising:

(a) location select means operable to select at least one of a plurality of geographic areas;

(b) alert select means operable to select a type of alert condition;

(c) code generator means having said location select means and said alert select means coupled thereto and operative to generate a composite code string combining a location code string corresponding to [the] *a* geographic area selected by said location select means and an alert code string corresponding to [the] *a* type of alert condition selected by said alert select means;

(d) television broadcast and/or FM radio broadcast and/or AM radio broadcast media having said code generator means coupled thereto and generating a broadcast signal on an existing broadcast frequency upon which is broadcast information which is *normally* unrelated to the [geographic areas] *location code string* or the alert [condition] *code string*, which broadcast signal is modified to incorporate said composite code string *by temporarily replacing a standard audio portion of said broadcast signal by an alert audio portion in which said composite code is encoded therein using a frequency modulated technique*;

(e) at least one alert receiver means positioned in one of said geographic areas and operative to receive [said] *the* modified broadcast signal and extract said composite code string therefrom;

(f) alarm means coupled to said receiver means and operative, when activated, to process said alert code string and generate an alarm signal;

(g) said receiver means including location code set means enabling user entry of a location code corresponding to one of said geographic areas *and user re-entry of a location code as often as needed*; and (h) location decode means coupling said alarm means to said receiver means and having said location code set means coupled thereto, said location decode means being operative to compare said location code string in the received composite code string with the user entered location *code* and, upon matching, activating said alarm means to generate said alarm signal.

18. An emergency warning receiver unit for receiving a broadcast signal on an existing broadcast frequency from television broadcast and/or FM radio broadcast and/or AM radio broadcast media, which broadcast signal includes information which is *normally* unrelated to *any* location code or alert [conditions] *code*, the broadcast signal being modified to incorporate a composite code string including a location code string representing *at least* one of a plurality of geographic areas and an alert code string representing a type of alert condition *by temporarily replacing a standard audio portion of said broadcast signal by an alert audio portion in which said composite code string is encoded therein using a frequency modulated technique*, said receiver comprising:

(a) broadcast signal demodulation means operative to receive [said] *the* modified broadcast signal and extract said composite code string therefrom;

(b) alarm means coupled to said demodulation means and operative, when activated, to process said alert code string and generate an alarm signal;

(c) location code set means coupled to said demodulation means and enabling user entry of a location code corresponding to one of said geographic areas *and user re-entry of a location code as often as needed*; and (d) location decode means coupled with said demodulation means, *said alarm means,* and said location code set means and operative to compare said location code string in the received composite code string with the user entered location code and, upon matching, activating said alarm means to generate said alarm signal.

26. A [system] *unit* as set forth in claim 18 wherein the types of alert conditions which can be indicated by said alert code string and demodulated by said broadcast signal demodulator means includes an "all clear" condition.

\* \* \* \* \*